United States Patent
Yi et al.

(10) Patent No.: US 10,045,341 B2
(45) Date of Patent: Aug. 7, 2018

(54) METHOD AND APPARATUS FOR WIRELESS COMMUNICATION OF MACHINE TYPE COMMUNICATION

(71) Applicant: LG ELECTRONICS INC., Seoul (KR)

(72) Inventors: Yunjung Yi, Seoul (KR); Joonkui Ahn, Seoul (KR); Suckchel Yang, Seoul (KR); Hyangsun You, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/106,266

(22) PCT Filed: Dec. 18, 2014

(86) PCT No.: PCT/KR2014/012544
§ 371 (c)(1),
(2) Date: Jun. 17, 2016

(87) PCT Pub. No.: WO2015/093877
PCT Pub. Date: Jun. 25, 2015

(65) Prior Publication Data
US 2016/0309470 A1    Oct. 20, 2016

Related U.S. Application Data

(60) Provisional application No. 61/917,900, filed on Dec. 18, 2013, provisional application No. 61/968,455, filed on Mar. 21, 2014.

(51) Int. Cl.
*H04W 72/04*    (2009.01)
*H04W 56/00*    (2009.01)
*H04W 72/00*    (2009.01)

(52) U.S. Cl.
CPC ..... *H04W 72/0446* (2013.01); *H04W 56/001* (2013.01); *H04W 72/042* (2013.01); *H04W 72/00* (2013.01)

(58) Field of Classification Search
CPC ... H04W 72/00; H04W 72/04; H04W 72/042; H04W 72/0446; H04W 56/001; H04W 72/048; H04W 72/1289
See application file for complete search history.

(56) References Cited

U.S. PATENT DOCUMENTS

2009/0156225 A1* 6/2009 Angelow ............. H04J 11/0093
455/450
2009/0175179 A1* 7/2009 Stewart ............... H04L 27/2613
370/252

(Continued)

FOREIGN PATENT DOCUMENTS

CA    2842305    1/2013
CN    1947357    4/2007

(Continued)

OTHER PUBLICATIONS

PCT International Application No. PCT/KR2014/012544, International Search Report dated Mar. 18, 2015, 1 page.

(Continued)

*Primary Examiner* — Hoang-Chuong Q Vu
(74) *Attorney, Agent, or Firm* — Lee Hong Degerman Kang Waimey

(57) ABSTRACT

A method and an apparatus for wireless communication in case of MTC are provided. The method comprises receiving a signal, wherein a control signal is received on a downlink control channel based on limited reception capacity of the UE and transmitting signals on a uplink channel based on the received signal via the downlink channel.

14 Claims, 7 Drawing Sheets

(56) References Cited

U.S. PATENT DOCUMENTS

| | | | |
|---|---|---|---|
| 2012/0077445 A1 | 3/2012 | Konno et al. | |
| 2012/0274849 A1 | 11/2012 | Suzuki et al. | |
| 2012/0281567 A1* | 11/2012 | Gao | H04B 7/0626 370/252 |
| 2012/0281640 A1* | 11/2012 | Xu | H04L 5/0048 370/329 |
| 2013/0083753 A1 | 4/2013 | Lee et al. | |
| 2013/0136098 A1 | 5/2013 | Li et al. | |
| 2013/0155954 A1 | 6/2013 | Wang et al. | |
| 2014/0036747 A1* | 2/2014 | Nory | H04W 72/0406 370/311 |
| 2014/0044057 A1* | 2/2014 | Gaal | H04W 72/042 370/329 |
| 2014/0146737 A1* | 5/2014 | Ohshima | H04W 4/06 370/312 |
| 2014/0153471 A1* | 6/2014 | Zhang | H04W 4/06 370/312 |
| 2014/0198645 A1* | 7/2014 | Worrall | H04W 4/06 370/230 |
| 2014/0204825 A1* | 7/2014 | Ekpenyong | H04L 5/001 370/312 |
| 2014/0226552 A1* | 8/2014 | Niu | H04W 4/06 370/312 |
| 2014/0307698 A1* | 10/2014 | Beale | H04L 5/0044 370/329 |
| 2015/0181575 A1* | 6/2015 | Ng | H04L 5/0092 370/329 |
| 2015/0215085 A1* | 7/2015 | Xu | H04W 4/06 370/312 |

FOREIGN PATENT DOCUMENTS

| | | |
|---|---|---|
| CN | 101931877 | 12/2010 |
| CN | 101998267 | 3/2011 |
| EP | 2469784 | 6/2012 |
| WO | 2013047235 | 4/2013 |
| WO | 2013082937 | 6/2013 |
| WO | 2013093437 | 6/2013 |

OTHER PUBLICATIONS

European Patent Office Application Serial No. 14873094.8, Search Report dated Jun. 28, 2017, 7 pages.

The State Intellectual Property Office of the People's Republic of China Application Serial No. 201480069712.7, Office Action dated Jun. 19, 2018, 8 pages.

\* cited by examiner

METHOD AND APPARATUS FOR WIRELESS COMMUNICATION OF MACHINE TYPE COMMUNICATION

CROSS-REFERENCE TO RELATED APPLICATIONS

This application is the National Stage filing under 35 U.S.C. 371 of International Application No. PCT/KR2014/012544, filed on Dec. 18, 2014, which claims the benefit of U.S. Provisional Application Nos. 61/917,900, filed on Dec. 18, 2013, and 61/968,455, filed on Mar. 21, 2014, the contents of which are all hereby incorporated by reference herein in their entirety.

TECHNICAL FIELD

The present application is relates to wireless communication, more specifically to machine type communication (MTC) device with limited capacity.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users' demand for services that may support higher quality and higher capacity while ensuring mobility, as well as voice services. The LTE system provides for low transmission delay, high transmission rate and system capacity, and enhanced coverage.

In next generation of LTE-A, it is considered configuring a system using a low cost and/or low specification (low performance) terminal mainly for a data communication such as reading an electric meter, measuring water level, surveillance, stock management of a vending machine, etc. The terminal may be called as machine type communication (MTC) device (MTC terminal) for a convenience of description.

As for the usage of the MTC device, it is efficient to use a MTC device with a low price and a low battery consumption since an amount of transmitted data may be small and there may occasionally be an uplink/downlink data transmission in a case of a communication using the MTC device.

SUMMARY OF INVENTION

Technical Problem

An object of the present invention is to provide method and apparatus for wireless communication for MTC with limited coverage.

Another object of the present invention is to provide method and apparatus for receiving and/or transmitting unicast data and broadcast data with limited coverage.

Another object of the present invention is to provide method and apparatus for determining valid PRBs among allocated PRBS by a UE with limited coverage.

Technical Solution

An embodiment of the present invention is a method for wireless communication by a user equipment (UE) of which reception coverage is limited. The method comprises receiving a signal, wherein a control signal is received on a downlink control channel based on the reception coverage of the UE and transmitting signals on a uplink channel based on the received signal via the downlink channel. Here, a subframe at which unicast data is received and a subframe at which broadcast data is received may be different. Or, unicast data may be received with priority over broadcast data when the unicast data and the broadcast data are transmitted at same subframe. In addition, allocated resource blocks may be determined as valid when the allocated resource blocks are monitored based on the control signal.

Another embodiment of the present invention is an apparatus for wireless communication of which reception coverage is limited. The apparatus comprises a radio frequency (RF) unit for transmitting and receiving a radio signal and a processor operatively coupled to the RF unit, wherein the processor is configured for transmitting signals via the RF unit based on a scheduling for UL and/or DL, wherein the processor receives a control signal on a downlink control channel based on the reception coverage. Here, a subframe at which unicast data is received and a subframe at which broadcast data is received may be different. Or, unicast data may be received with priority over broadcast data when the unicast data and the broadcast data are transmitted at same subframe. In addition, allocated resource blocks may be determined as valid when the allocated resource blocks are monitored based on the control signal.

Advantageous Effects

According to the present invention, the UE can efficiently communicate with limited coverage.

According to the present invention, the UE with limited coverage can receive unicast data without confliction with broadcast data.

According to the present invention, the UE with limited coverage can operate with valid PRBs among allocated PRBs.

MODE FOR INVENTION

Figure 1:
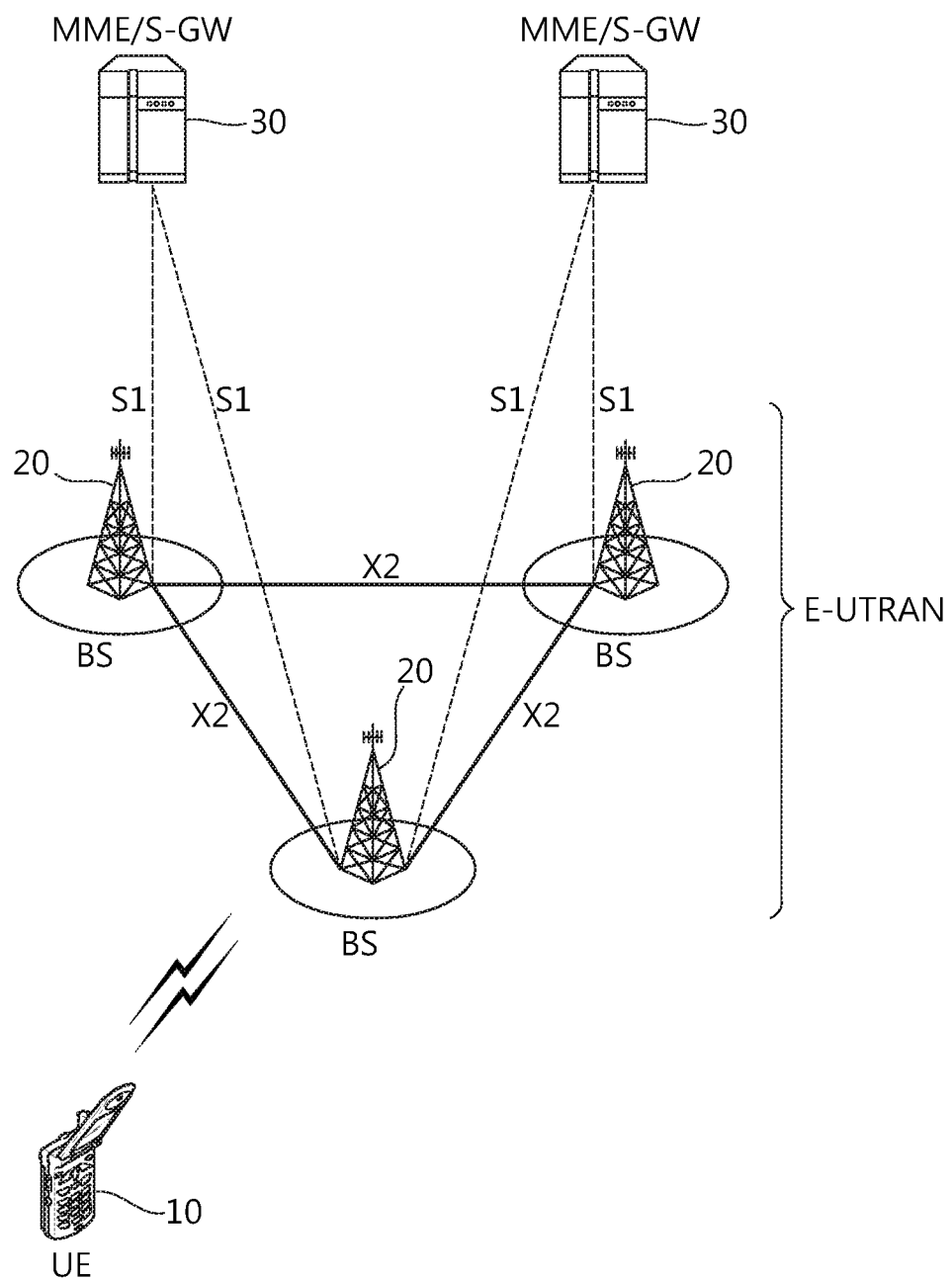
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to an user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, a cell, node-B, or node etc.

Multi-access schemes applied to the wireless communication system are not limited. Namely, various multi-access schemes such as CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

More details, radio protocol architecture for a user plane (U-plane) and a control plane (C-plane) are explained. A PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface. Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection. A radio resource control (RRC) layer is defined only in the control plane. The RRC layer serves to control the logical channel, the transport channel and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (it may also be referred to as an RRC connected mode), and otherwise the UE is in an RRC idle state (it may also be referred to as an RRC idle mode).

Figure 2:
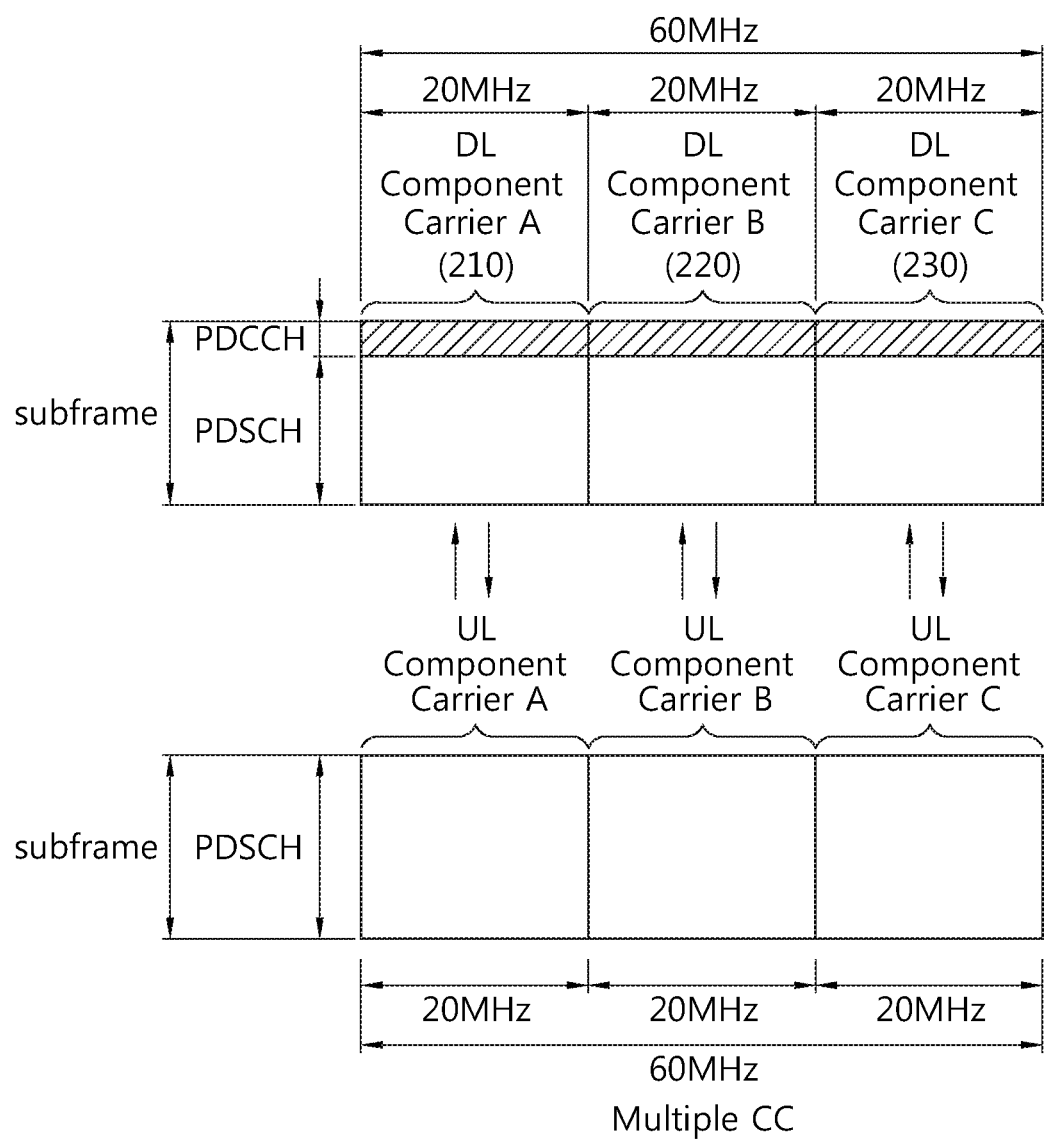
FIG. 2 shows an exemplary concept for a carrier aggregation (CA) technology according to an exemplary embodiment of the present invention.

FIG. 2 shows an exemplary concept for a carrier aggregation (CA) technology according to an exemplary embodiment of the present invention.

Referring to FIG. 2, the downlink (DL)/uplink (UL) subframe structure considered in 3GPP LTE-A (LTE-Advanced) system where multiple CCs are aggregated (in this example, 3 carriers exist) is illustrated, a UE can monitor and receive DL signal/data from multiple DL CCs at the same time. However, even if a cell is managing N DL CCs, the network may configure a UE with M DL CCs, where M≤N so that the UE's monitoring of the DL signal/data is limited to those M DL CCs. In addition, the network may configure L DL CCs as the main DL CCs from which the UE should monitor/receive DL signal/data with a priority, either UE-specifically or cell-specifically, where L≤M≤N. So the UE may support one or more carriers (Carrier 1 or more Carriers 2 . . . N) according to UE's capability thereof.

A Carrier or a cell may be divided into a primary component carrier (PCC) and a secondary component carrier (SCC) depending on whether or not they are activated. A PCC is always activated, and an SCC is activated or deactivated according to particular conditions. That is, a PCell (primary serving cell) is a resource in which the UE initially establishes a connection (or a RRC connection) among several serving cells. The PCell serves as a connection (or RRC connection) for signaling with respect to a plurality of cells (CCs), and is a special CC for managing UE context which is connection information related to the UE. Further, when the PCell (PCC) establishes the connection with the UE and thus is in an RRC connected mode, the PCC always exists in an activation state. A SCell (secondary serving cell) is a resource assigned to the UE other than the PCell (PCC). The SCell is an extended carrier for additional resource assignment, etc., in addition to the PCC, and can be divided into an activation state and a deactivation state. The SCell is initially in the deactivation state. If the SCell is deactivated, it includes not transmit sounding reference signal (SRS) on the SCell, not report CQI/PMI/RI/PTI for the SCell, not transmit on UL-SCH on the SCell, not monitor the PDCCH on the SCell, not monitor the PDCCH for the SCell. The UE receives an Activation/Deactivation MAC control element in this TTI activating or deactivating the SCell.

To enhance the user throughput, it is also considered to allow inter-node resource aggregation over more than one eNB/node where a UE may be configured with more than one carrier groups. It is configured PCell per each carrier group which particularly may not be deactivated. In other words, PCell per each carrier group may maintain its state to active all the time once it is configured to a UE. In that case, serving cell index i corresponding to a PCell in a carrier group which does not include serving cell index 0 which is a master PCell cannot be used for activation/deactivation.

More particularly, if serving cell index 0, 1, 2 are configured by one carrier group whereas serving cell index 3, 4, 5 are configured by the other carrier group in two carrier group scenarios where serving cell index 0 is PCell and serving cell index 3 is the PCell of the second carrier group, then only bits corresponding 1 and 2 are assumed to be valid for the first carrier group cell activation/deactivation messages whereas bits corresponding 4 and 5 are assumed to be valid for the second carrier group cell activation/deactivation. To make some distinction between PCell for the first carrier group and the second carrier group, the PCell for the second carrier group can be noted as S-PCell hereinafter. Herein, the index of the serving cell may be a logical index determined relatively for each UE, or may be a physical index for indicating a cell of a specific frequency band. The CA system supports a non-cross carrier scheduling of self-carrier scheduling, or cross carrier scheduling.

Figure 3:
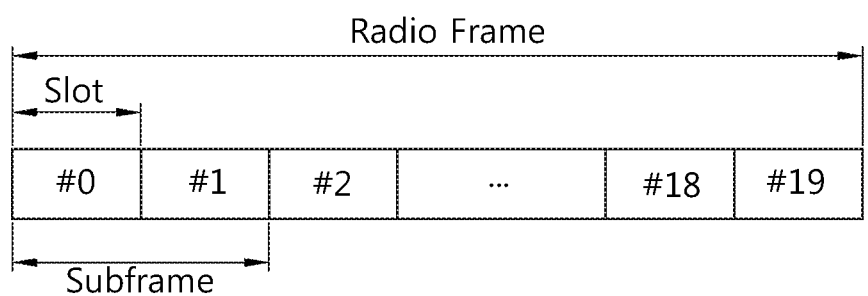
FIG. 3 shows a structure of a radio frame to which the present invention is applied.

FIG. 3 shows a structure of a radio frame to which the present invention is applied. Referring to FIG. 3, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE system and it may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration of the CP (Cyclic Prefix). The CP includes an extended CP and a normal CP. For example, if normal CP case, the OFDM symbol is composed by 7. If configured by the extended CP, it includes 6 OFDM symbols in one slot. If the channel status is unstable such as moving at a fast pace UE, the extended CP can be configured to reduce an inter-symbol interference. Herein, the structure of the radio frame is only illustrative, and the number of subframes included in a radio frame, or the number of slots included in a subframe, and the number of OFDM symbols included in a slot may be changed in various ways to apply new communication system. This invention has no limitation to adapt to other system by varying the specific feature and the embodiment of the invention can apply with changeable manners to a corresponding system.

The downlink slot includes a plurality of OFDM symbols in the time domain. For example, one downlink slot is illustrated as including 7 OFDMA symbols and one Resource Block (RB) is illustrated as including 12 subcarriers in the frequency domain, but not limited thereto. Each element on the resource grid is called a Resource Element (RE). One resource block includes 12×7 (or 6) REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively.

The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated. Examples of downlink control channels include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARQ). That is, ACK/NACK signals for uplink data that has been transmitted by a UE are transmitted on a PHICH. A PDCCH (or ePDCCH) is a downlink physical channel, a PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc.

A plurality of PDCCHs may be transmitted within the control region, and a UE can monitor a plurality of PDCCHs. The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs.

The wireless communication system of the present invention uses blind decoding for Physical Downlink Control Channel (PDCCH) detection. The blind decoding is a scheme in which a desired identifier is de-masked from a CRC of a PDCCH to determine whether the PDCCH is its own channel by performing CRC error checking. An eNB determines a PDCCH format according to a Downlink Control Information (DCI) to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH. For example, if the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (e.g., P-RNTI)) may be masked to the CRC. If the PDCCH is for system information (more specifically, a system information block (SIB) to be described below), a system information identifier and system information RNTI (e.g., SI-RNTI) may be masked to the CRC. To indicate a random access response that is a response for transmission of a random access preamble of the UE, a random access-RNTI (e.g., RA-RNTI) may be masked to the CRC.

Thus, the BS determines a PDCCH format according to a Downlink Control Information (DCI) to be transmitted to the UE, and attaches a cyclic redundancy check (CRC) to control information. The DCI includes uplink or downlink scheduling information or includes an uplink transmit (Tx) power control command for arbitrary UE groups. The DCI is differently used depending on its format, and it also has a different field that is defined within the DCI.

Meanwhile, an uplink subframe may be divided into a control region to which a physical uplink control channel (PUCCH) that carries uplink control information is allocated; the control information includes an ACK/NACK response of downlink transmission. A data region to which physical uplink shared channel (PUSCH) that carries user data is allocated in the frequency domain.

The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a channel quality indication (CQI), and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system.

Figure 4:
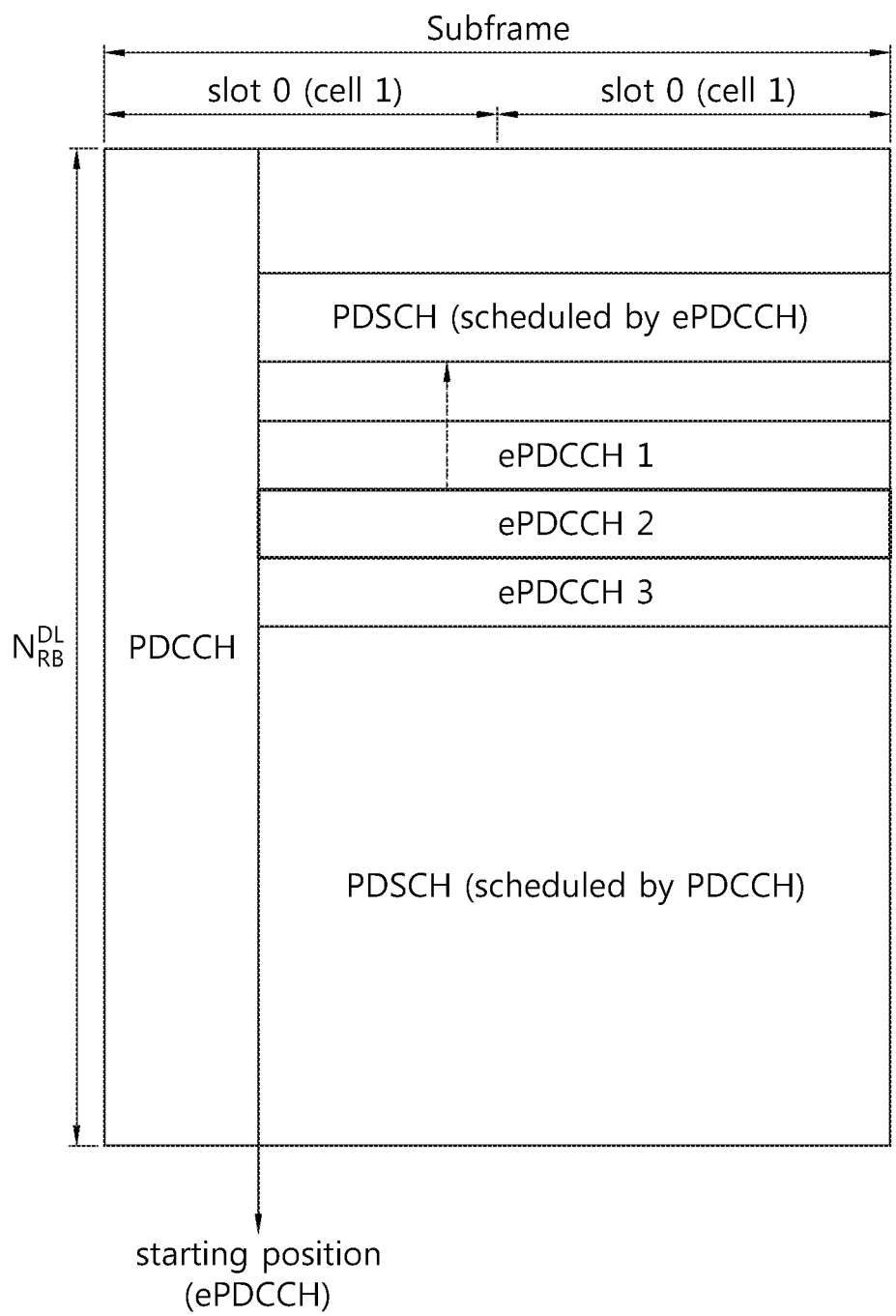
FIG. 4 shows downlink control channels to which the present invention is applied.

Herein, an ePDCCH can be one of solutions of limitation for a PDCCH transmission or new control information transmission of near future communication system including a new type of carrier as shown in FIG. 4.

FIG. 4 shows downlink control channels to which the present invention is applied. The ePDCCH which can be multiplexed with the PDSCH can support multiple Scells of the CA.

Referring to FIG. 4, the UE can monitor a plurality of PDCCH/ePDCCHs within the control region and/or data region. While EPDCCH is transmitted in UE specific search space, PDCCH can be transmitted in common search space as well as in UE specific search space. As the PDCCH is transmitted on CCE, ePDCCH can be transmitted on eCCE (enhanced CCE) as an aggregation of some contiguous CCEs, the eCCE corresponds to a plurality of REGs. If ePDCCH is more efficient than PDCCH, it is worthwhile to have subframes where only ePDCCHs are used without PDCCHs. The PDCCHs and new ePDCCH only subframes, or have only ePDCCH only subframes can be in a new type of carrier as NC which has both legacy LTE subframes. It is still assumed that MBSFN subframes exist in a new carrier NC. Whether to use PDCCH in multimedia broadcast single frequency network (MBSFN) subframes in NC and how many ODFM symbols will be allocated if used can be configured via RRC signaling. Further TM10 and new TM mode of UE can be considered for new carrier type as well. Hereafter, new carrier type refers to a carrier where all or part of legacy signals can be omitted or transmitted in different manners. For example, a new carrier may refer a carrier where a cell-specific common reference signal (CRS) may be omitted in some subframes or physical broadcast channel (PBCH) may not be transmitted.

Meanwhile, in next generation of LTE-A system, it is considered using a terminal (user equipment) with low cost and low performance terminal mainly for a data communication such as reading an electric meter, measuring water level, surveillance, stock management of a vending machine, etc. This type of a terminal may be called as machine type communication (MTC) device (MTC UE). For the usage of the MTC device, it is efficient to maintain a MTC device with a low price and a low battery consumption since an amount of transmitted data may be small and there may occasionally be an uplink/downlink data transmission in a case of a communication using the MTC device.

For the MTC, it can be assumed that the MTC UE receives only data with narrower bandwidth than system bandwidth for reducing cost. For example, PRBs can be configured over system bandwidth when it is assumed that data reception is available only for 6 Physical Resource Block (PRB). And with a given configuration, it needs to consider how the UE actually decodes or interprets a resource allocation field and/or how the network allocates the resources when resource allocation is performed through DCI.

Hereinafter, resource allocation for MTC is described referring figures in detail.

Signaling of PRB Allocation

In terms of signaling of PRB allocation, overall the following three approaches (1) predetermined configuration, (2) semi-static configuration, and (3) dynamic configuration can be considered.

(1) Pre-determined configuration: Using this approach, a UE may be pre-configured with a set of PRBs that the UE should be able to read. The PRBs should be determined in consideration of system bandwidth and RBG.

One example would be to select PRBs as distributed manner as possible. For example, in 100 PRBs system, PRB #0, #99, #50, #75, #25, #49, and #87 can be selected. This may not consider RBG formation and selects the PRBs where the distance between the selected PRBs are distributed or large as much as possible. Another option is to select RBG in a distributed manner first and then select one PRB from each selected RBG. For example, in 100 PRBs system, there are 25 RBGs indexed e.g., 0 to 24. RBG can be selected in every 4 RBGs. Thus, for example, RBG #0, #4, #8, #12, #16, #20 may be selected and one PRB from each RBG can be selected (the same PRB can be selected from each RBG (e.g., first PRB from each RBG) or PRBs cab be randomly selected from each RBG, or PRB selection can follow a hopping pattern).

If contiguous resource allocation is used, a set of RBGs can be selected where all PRBs in those selected RBGs may be selected (or up to the maximum allowed number of PRBs). For example, RBG#0 and RBG#1 can be selected in 100 PRBs system where first 6 PRBs will be used for a UE which can read only 6 PRBs. In other words, selected RBs for MTC UEs may be aligned with PRGs and/or RBGs assignments. Another approach of this pre-determined configuration is to make a table where a set of PRBs is predetermined following bandwidth. One example would be table 1.

TABLE 1

| System Bandwidth $N_{RB}^{DL}$ | Selected PRBs |
|---|---|
| ≤10 | 0, 1, 2, 3, 4, 5 |
| 11-26 | 0, 2, 4, 6, 8, 10 |
| 27-63 | 0, 3, 6, 9, 12, 15, 18 |
| 64-110 | 0, 12, 24, 36, 48, 60 |

Referring to table 1, PRBs to be selected are pre-determined for each system bandwidth.

Also, for predetermined PRB setting, at least for unicast transmission/reception (i.e. individual transmissions to each terminal), random access reponse (RAR) can configure the PRBs used for the unicast transmission/reception (hereinafter, "unicast").

Or, a table can be specified where each table entry contains a set of PRBs used for unicast and a UE may select one table based on Cell Radio-Network Temporary Identifier (C-RNTI) or by higher layer configuration.

Pre-determined PRB can also have hopping per subframe, in other words, the PRB index may be determined or changed per subframe (or radio frame). This is to improve further frequency diversity. One example is to give cell-specific hopping pattern per each subframe (e.g., 0, 5, 8, 11, 14, 29, 40, 90, 39, 2, 1) where each PRB index changes per subframe following the pattern. A UE-specific pattern also can be considered. Cell-specific pattern may be created based on cell ID and predetermined. For unicast, UE-specific pattern also can be considered.

(2) Semi-static configuration: If a UE can be semi-statically configured with the set of PRBs, it may be limited to PRBs used for unicast data unless the set of PRBs are propagated via PBCH or cell-common data can be scheduled via cross-subframe scheduling.

This is to avoid the case of ambiguity where a UE is not successfully reconfigured with the new set whereas the network may consider the successful reconfiguration (or vice versa). This may not be useful for unicast data as well. Thus, without cross-subframe scheduling configured or enabled, semi-static reconfiguration may not be allowed.

To avoid fallback operation, semi-static reconfiguration may also carry the time when the new PRB set become effective. For example, single frequency network (SFN) can be given where the new PRB set will be used (or started). Also, the PRB set can be signaled by system information block (SIB) or master information block (MIB) or other means.

(3) Dynamic configuration: Dynamic reconfiguration may be enabled or achieved only with cross-subframe scheduling. Or, same-subframe scheduling can be used assuming a UE has the capability to monitor the limited PRBs.

When dynamic reconfiguration is used, a UE may assume that downlink bandwidth for data reception is the same as the system bandwidth. In other words, DCI size reduction by reducing downlink data bandwidth may not be easily achievable.

Cell-Common PDSCH and Unicast PDSCH Multiplexing

When a UE can be configured with a set of PRBs used for cell-common PDSCH and unicast PDSCH separately, there could be cases when cell-common PDSCH and unicast PDSCH may be transmitted in the same subframe and thus a UE may have to monitor more than 6 PRBs in total. As the capability of UE is limited, a mechanism to reduce the monitoring PRBs is necessary. Depending on the situations, the priority between cell-common or unicast can be different as below (i) to (iv).

(i) For example, PRBs for cell-common and unicast are pre-configured: It is possible to assign different PRBs for cell-common and unicast as cell-common should be shared by all low cost UEs whereas unicast PRBs can be frequency divisional multiplied (it can be called as "FDM-ed" in this application) among UEs.

Thus, it is likely that the PRB sets are different for each case. In this case, it is natural to consider time division multiplexing (TDM) approach where a UE is configured with a set of subframes for which the UE monitors cell-common data whereas another set (or the rest of subframes) for which the UE monitors unicast data.

One simple example is EPDCCH monitoring subframe configuration where if a UE is configured with EPDCCH monitoring subframe, a UE may assume that PRBs for cell-common are monitored in non-EPDCCH monitoring subframes whereas PRBs for unicast are monitored in EPDCCH monitoring subframes.

This can be applied for cross-subframe scheduling as well as same-subframe scheduling. For example, in cross-subframe scheduling, when ePDCCH is transmitted at n-th subframe and unicast data indicated by control data such as DCI on the ePDCCH is transmitted at (n+i)-th subframe (i>0, for example, i=1), a UE can assume that broadcast data is not transmitted or at least it is not required to read broadcast data at (n+i)-th subframe.

In other words, a UE may not expect to read unicast and broadcast data in the same subframe, and the subframes where a UE can expect unicast is determined by EPDCCH monitoring subframe set for example and the gap between EPDCCH and PDSCH (e.g., i). In other subframes, a UE may expect broadcast data. However, it is also notable that a UE may not expect to receive control channel and data channel at the same subframe either if cross-subframe scheduling is used if PRBs assigned to each are not overlapped due to UE's limited hardware capability. In such a case, broadcast data may be expected only in subframes neither scheduled by cross-subframe scheduling for unicast data nor configured as EPDCCH or control channel monitoring subframe.

Separate subset configuration is feasible. Before configuration or a UE in RRC_IDLE mode, all subframes are assumed as "cell-common" monitoring subframe such that the UE monitors PRBs for cell-common.

It is however noted that if a UE is scheduled to receive unicast data in a subframe which is configured as a potential subframe carrying cell-common data, the UE can read unicast-data in the subframe, i.e., if a UE can be scheduled via cross-subframe, then scheduled PDSCH has higher priority regardless of subframe type or configuration. In other words, indication via dynamic signaling may have higher priority over pre-determined PRBs or semi-statically configured PRBs.

When semi-persistent scheduling (SPS) is configured, regardless of subframe type/configuration, PRBs for SPS PDSCH may be monitored. Or, regardless of its capability, a UE may need to support both PRBs configured for cell-common and unicast any time. In this case, the UE requirement may increase.

(ii) For example, PRBs for cell-common is preconfigured and PRBs for unicast is dynamically indicated: In this case, unicast PRB has higher priority over cell-common. If there is DCI indicating different PRB set, a UE monitors the set of PRBs for cell-common as default behavior. This is applied to the case where PRBs for cell-common is semi-statically configured.

Separation of cell-common data monitoring subframe and unicast data monitoring subframe proposed in (i) can be applied in this case as well. In other words, techniques mentioned in (i) or (ii) can be applied to different cases including (i) and/or (ii).

(iii) When both cell-common and unicast DCI can come in the same subframe, cell-common DCI may have higher priority over unicast DCI. Thus, resource allocation used for cell-common DCI has higher priority.

Accordingly, UE may assume that those PRBs used for cell-common PDSCH is not valid for unicast data. With this assumption, when counting the number of PRBs scheduled for unicast, those PRBs may not be counted as a valid PRB.

Alternatively, a UE may assume those PRBs are rate-matched. With this assumption, in terms of number of PRBs, it follows DCI or the overlapped PRBs between scheduled PRBs and configured PRBs, and then UE may decide that those PRBs used for cell-common does not carry unicast PDSCH.

(iv) When subframes carrying cell-common PDSCH are determined (semi-statically or pre-determined), a UE shall put higher priority on cell-common PRBs over unicast PRBs. If the total number of PRBs either for cell-common or unicast, UE may need to monitor more PRBs (e.g., 6 PRBs for each, then 12 PRBs in total). When there is overlap between two sets, UE may decide that cell-common PRB has higher priority over unicast PRB.

Thus, when a UE receives unicast in those subframes configured for cell-common, it shall count PRBs not over-lapped with configured for cell-common PRBs. In other subframes, unicast PRB has higher priority.

Note that inventions proposed in this disclosure are applicable to any case with different scheduling mechanism such as self-scheduling or same-subframe scheduling or cross-subframe scheduling.

Resource Allocation Field Interpretation

Once a UE is configured with a set of PRBs to monitor, how to configure resource allocation (RA) field in RA in DCI and how to interpret the RA field and thus extracts transport block size (TBS) and others need to be defined. Unless otherwise noted, it needs to be assumed that the number of RB to extract TBS would be either min {number of PRBs scheduled, number of PRBs that UE can monitor}. Overall, two approaches (A) and (B) can be considered.

(A) RA should assume that downlink bandwidth for PDSCH is the maximum number of PRBs that UE can monitor. For example, a UE can monitor only 6 PRBs, the downlink bandwidth size for RA field would be '6' PRBs rather than system bandwidth.

In terms of resource allocation interpretation and TBS calculation, downlink bandwidth may be assumed as "6" in this case. Note that 6 PRBs here is used as an example. The number of actual PRBs that UE can monitor can be different per number of PDCCH OFDM symbols, network configurations, or scenarios. For other numbers, techniques described in this invention are applicable without loss of generality.

However, as physical resources can be non-contiguous, it may be assumed that RBG (RB grouping) is not used for this type of UE (i.e., UE which is not capable of receiving over the entire system bandwidth). Or, RBG is used where a RBG consists of multiple PRBs which are consecutive among PRBs selected for the low cost UE. In other words, RBG can be formed over potentially non-contiguous PRBs.

If this technique is used, TBS may be computed as the number of PRBs assigned to the PDSCH. This is similar concept to create a virtual PRB where the lowest PRB index maps to the virtual PRB index 0 (ascending order). This however cannot be used for cell-common data as it may be shared with legacy UE which reads the full system bandwidth. However, to separate cell-common for low cost UEs is also feasible. It may be signaled by PBCH or other SIB which will be used (either full system bandwidth or limited bandwidth for cell-common DCI).

Thus, for cell-common data, a UE with limited downlink bandwidth monitoring capability, some data loss due to not monitoring all the scheduled PRBs can be also possible. In this case, the number of PRBs for TBS extraction may follow the number of scheduled PRBs in scheduling.

(B) RA should assume that downlink bandwidth for PDSCH is same as system bandwidth. In this example, for instance for cell-common data, even though a UE may be able to monitor a limited set of PRBs, resource allocation should be based on system bandwidth. This would be necessary, for example, for cross-subframe or same-subframe scheduling based dynamic monitoring PRB change or for cell-common DCI. In this case, when different resource allocation type is used, there could be a case "mismatch" between DCI and the PRB set that the UE monitors. For example, a UE monitors PRB #0, #4, #8, #12, #16, #20 in system bandwidth of 100 PRBs, and the UE is scheduled with resource allocation type 2 (resource indication value, RIV), PRBs scheduled by RIV may not belong to the monitoring PRBs. Resource allocation type 2 may allow for the allocation of resource blocks that are contiguous in the frequency domain.

In above case, handling would be necessary such as (a), (b) and/or (c).

Figure 5:
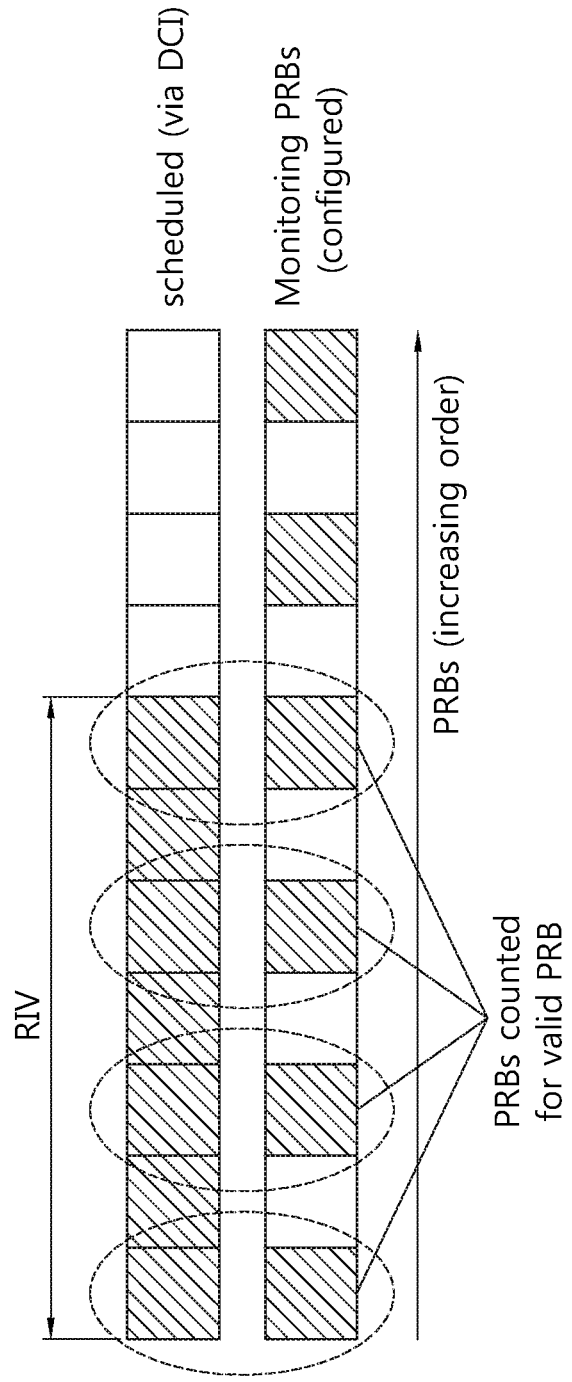
FIG. 5 briefly describes counting matching PRBs only.

(a) UE may skip those PRBs from counting number of PRBs and counts only matching PRBs. Thus, number of PRBs assigned by DCI and actual PRB number may be different. This may be applied to all resource allocation types. Thus, a separate signaling of number of PRBs scheduled may be dynamically signaled for the reliability. FIG. 5 briefly describes counting matching PRBs only. Referring to FIG. 5, among PRBs scheduled by DCI, monitored PRBs are counted as valid PRBs by the UE.

(b) For a cross-subframe or same-subframe scheduling, UE may put higher priority on the DCI. Note that this technique can be applied to either cross-subframe or same-subframe scheduling as well as to self-scheduling or cross-carrier scheduling.

In essence, this technique may be applied to a case where scheduled resource allocation may not match the UE capability in terms of downlink data bandwidth. Thus, all the assigned PRBs by DCI should be assumed as "valid" PRBs and those PRBs are monitored.

If the number of PRBs assigned by DCI exceeds the maximum number of supportable PRBs, UE may drop DCI as invalid DCI. Alternatively, due to the limitation of resource allocation type, if DCI assigns more PRBs than the number of PRBs that UE can read, the UE may set the number of PRBs scheduled by DCI as the maximum number of PRBs that UE can read (e.g., 6).

In terms of PRB, it shall match to the pre-configured or configured monitoring PRBs. Or if those are not available (such as for cross-subframe), PRBs may be selected to start with lowest PRB index from the assigned PRBs until the maximum supportable PRB counts. For example, if #0, #4,

8, #12, #16, #20, #24, #32 are scheduled, then, first 6 (#0, #4, #8, #12, #16, #20) will be assumed as valid PRBs (other rules can be applied as well for example, the highest PRB index first).

When this technique is applied, UE may determine the number of assigned RB for TBS lookup based on the actual number of PRBs that the UE has read. For example, if the DCI schedules 8 PRBs where the UE has read 6 PRBs only due to its capability limitation, 6 PRB may be used for TBS computation.

In a case when a UE cannot assume that the network knows the UE capability in terms of limited data bandwidth (for example, for cell-common data scheduling), UE may use the number of RBs in a scheduling DCI with some performance impact due to the unread PRBs.

Furthermore, whether to monitor either the lower PRB indices first or highest PRB indices first when selecting the valid PRBs, eNB may indicate the direction (either from the lowest or from the highest) via DCI.

Furthermore, when DCI 2C type of 2 codeword enabled DCI is used, second codeword related DCI fields may be used to indicate the direction (either from the lowest or from the highest) or the bitmap of PRBs to read. DCI format 2C is defined as in 3GPP TS 36.211. For example, [1 1 1 1 0 0 1 1] indicates that assume valid PRBs starting from the lowest thus in the example #0, #4, #8, #12, #24, #32 are assumed as valid in this case.

More specifically, this options is applicable to same-subframe scheduling where a UE may be able to monitor the entire system bandwidth, yet is not capable of processing more than a limited number of PRBs at a time. In that case, due to the limitation of resource allocation, it is possible that more PRBs than UE can handle can be scheduled. Thus, the same rule to ignore excessive PRBs can be considered for this case.

(c) For cell-common DCI, if it is shared with legacy UE, even though a low cost MTC UE may not be able to monitor all the PRBs assigned by DCI, cell-common data may be transmitted in those PRBs.

In this case, a UE may set the number of PRBs equal to the number of PRBs assigned by DCI. Then, since it is not able to read those "not-configured" or "not-supported" (predetermined or semi-statically configured) PRBs, the overall code rate would be much higher than the assigned DCI. From a MTC UE perspective, it is similar to data is punctured in those not-supported PRBs which are assigned by resource allocation in DCI, yet not supported by the UE due to its limited hardware capability.

It is up to the network to make it sure all UEs can read cell-common data with consideration of low cost UEs. Thus, a UE may assume that it can decode PDSCH by reading only limited PRBs even in the case where the PDSCH may be transmitted over more than those limited PRBs. In other words, for cell-common and/or for unicast PDSCH, resource allocation assigned by DCI has higher priority in terms of determining TBS and other operation.

If this is applied, a low cost UE may need to receive data with "higher code rate" than scheduled by DCI. More specifically, this may be applied only for cell-common. Or, separate cell-common PDSCH is used for low cost UEs different from legacy UEs. The UE may assume that "only PRBs assigned as monitoring PRBs" are valid and thus if DCI indicates other PRBs, the UE may ignore those PRBs in terms of calculating number of PRBs and read the data.

More specifically, when system-information radio-network temporary identifier (SI-RNTI) scrambled DCI is received, the TBS will be based on explicit field in DCI format 1A (when 1A is used), in that case, a UE may determine only PRBs matched between scheduled and configured as valid PRBs. When DCI format 1C is used, the TBS size should be determined either based on DCI or based on the configured PRBs.

Which way to determine TBS may be specified in the specification. For example, if cell-common is not shared with legacy UE, only valid PRBs are counted for TBS and if cell-common may be shared with legacy UE, assigned PRBs are counted for TBS at least for cell-common data.

Further, this may be limited to SI-RNTI and transmit power control RNTI (TPC-RNTI). And then, random access RNTI (RA-RNTI), paging RNTI (P-RNTI) may be assumed that a UE counts the only valid PRBs by configuration and DCI assignment.

Fallback (or DCI Format 1A)

If a UE can be reconfigured with a set of PRBs to monitor, to avoid ambiguity, those reconfiguration messages needs to be delivered in cell-common monitoring subframe or subframe/PRBs configured for fall-back operation.

One way to achieve this is to fix a subset of PRBs not allowed to be changed. For example, a UE is configured with PRB #0, #4, #8, #12, #16, #20 for unicast data monitoring PRBs, then at least a few PRBs need to be fixed such as #0, #4, #8 and then DCI format 1A scheduled PDSCH may be scheduled only in those subframes.

New set may include #0, #4, #8 those fixed PRBs so that fall back operation can be implemented. In fall-back mode or DCI format 1A scheduled PDSCH, a UE may assume that it will be scheduled only in those PRBs (fixed PRBs).

To handle the situation between cell-common and unicast as well, it may be desirable to assume at least a few PRBs between cell-common and unicast monitoring PRBs are shared so that the network can schedule a data to those PRBs when potential ambiguity arises.

Usage of Both Contiguous and Non-Contiguous Resource Allocation

When both types can be configured, a UE may need to be specified which one is used at least for cell-common. Either a UE may read the first cell-common DCI and assume that the same mechanism is used for the rest of cell-common unless configured as otherwise.

For example, if the firstly detected DCI uses resource allocation type 0 (contiguous), it may assume that it shall use contiguous. Or, type1 resource allocation (RA), UE may assume non-contiguous RA is used and then monitor PRBs scheduled via DCI. With type2, depending on local or distributed, UE assumes contiguous or non-contiguous. Then, it starts to read cell-common starting next subframe. In that subframe, UE may not be able to detect the PDSCH successfully as it may monitor different PRBs. By default, it shall use center 6PRB.

When a UE is configured or signalled which type or PRBs is used, it shall monitor those PRBs (i.e., configuration has higher priority over implicit detection from DCI).

Figure 6:
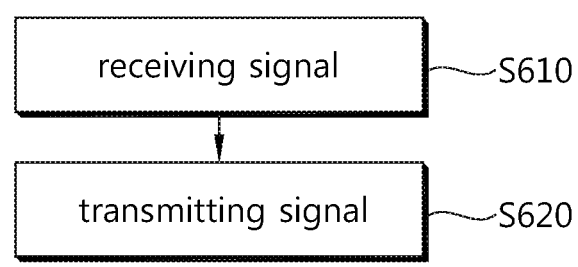
FIG. 6 is a flow chart briefly describing an operation of a UE according to the invention(s) of this disclosure.

FIG. 6 is a flow chart briefly describing an operation of a UE according to the invention(s) of this disclosure.

Referring to FIG. 6, the UE receives signal on a downlink channel (S610). When the UE is MTC, of which reception capacity (reception coverage) is limited, the reception of signal is performed based on the reception capacity. For example, the UE may receive control signal on a downlink control channel (e.g. ePDCCH) based on the limited coverage of the UE when the UE is a MTC UE.

The UE may transmit signal on a uplink channel (S620). The transmitted signal may be a signal corresponding to the received signal.

In the process of receiving/transmitting a signal, the UE may operate as MTC UE. For example, in the operation of signal reception, considering capacity as a MTC UE such as narrow bandwidth for MTC UE, TDM can be applied between unicast data and broadcast data. In other words, a subframe at which unicast data is received and a subframe at which broadcast data is received may be different.

For example, the UE may receive broadcast data at a subframe next to a subframe indicated by the downlink control channel as a subframe for receiving unicast data. Alternatively, in consideration of capacity, the UE may give a priority to one of unicast data and broadcast data. For example, the UE may receive unicast data with priority over broadcast data when the unicast data and the broadcast data are transmitted at same subframe.

As another embodiment, the UE, which is MTC UE, may decide some PRBs as invalid among PRBs which are scheduled by DCI. For example, the UE may determine allocated resource blocks are valid when the allocated resource blocks are monitored based on the control signal. The control signal may be received on ePDCCH.

These operations and the other operations of UE according to the inventions of the present application are same as described in detail before.

Figure 7:
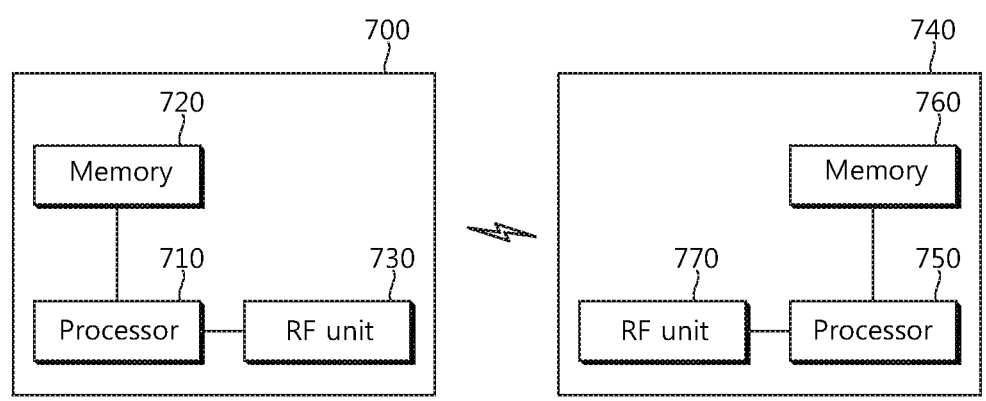
FIG. 7 is a block diagram briefly describing a wireless communication system including an UE and a BS (eNB).

FIG. 7 is a block diagram briefly describing a wireless communication system including an UE 700 and a BS (eNB) 740. The UE 700 and the BS 740 may operate based on the description as explained above.

In view of downlink, a transmitter may be a part of the BS 740 and a receiver may be a part of the UE 700. In view of uplink, a transmitter may be a part of the UE 700 and a receiver may be a part of the BS 740.

Referring to FIG. 7, the UE 700 may include a processor 710, a memory 720 and a radio frequency (RF) unit 730.

The processor 710 may be configured to implement proposed procedures and/or methods described in this application. For example, the processor 710 may monitor control channel based on the control signal.

The processor 710 may receive and transmit signals considering capacity of the UE 700. For example, when the UE 700 is MTC UE, the processor 710 may receive broadcast data at a subframe next to a subframe indicated by the downlink control channel as a subframe for receiving unicast data. Or, the processor 710 may give a priority to one of unicast data and broadcast data. For example, the processor 710 may receive unicast data with priority over broadcast data when the unicast data and the broadcast data are transmitted at same subframe. As another embodiment, the processor 710 may decide some PRBs as invalid among PRBs which are scheduled by DCI. For example, the processor 710 may determine allocated resource blocks are valid when the allocated resource blocks are monitored based on the control signal. The control signal may be received on ePDCCH.

The memory 720 is coupled with the processor 710 and stores a variety of information to operate the processor 710, which includes data information and/or control information. The RF unit 730 is also coupled with the processor 710. The RF unit 730 may transmit and/or receive a radio signal.

The details of the UE 700 are same as described before with or without figures.

The BS 740 may include a processor 750, a memory 760 and a RF unit 770. Here, the BS 740 may be PCell or SCell and the BS 740 may be a macro cell or small cell. In addition the BS may be a source cell for network synchronization or a target cell for network synchronization.

The processor 750 may be configured to implement proposed procedures and/or methods described in this application. For example, the processor 750 may transmit control channel such as PDCCH/EPDCCH, system information, data channel such as PDSCH repeatedly in consideration that the UE receiving the signals is a MTC UE. For example, the processor 750 may apply TDM between unicast data and broadcast data. In other words, the processor 750 may transmit unicast data broadcast data at different subframes. For example, the processor 750 may transmit broadcast data at a subframe next to a subframe for transmitting unicast data. The processor 750 may indicate the subframe for transmitting unicast data by control signal on the downlink control channel such as ePDCCH. Or, the processor 750 may configure a priority between unicast data and broadcast data. For example, the processor 750 may schedule with giving priority to unicast data over broadcast data when the unicast data and the broadcast data are transmitted at same subframe. As another embodiment, the processor may schedule or transmit signal for MTC UE such that allocated resource blocks are determined as valid when the UE monitored them based on the control signal. The control signal may be received on ePDCCH.

The memory 760 is coupled with the processor 750 and stores a variety of information to operate the processor 750, which includes data information and/or control information. The RF unit 770 is also coupled with the processor 750. The RF unit 770 may transmit and/or receive a radio signal. The signals transmitted or received via the RF unit 770 are also described before.

The UE 700 and/or the BS 740 may have single antenna or multiple antennas. The wireless communication system may be called as MIMO system when at least one of the UE 700 and the BS 740 has multiple antennas.

The more detailed descriptions for the BSs are same as described before with or without figures.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps.

Furthermore, the above-described embodiments include various aspects of examples. Accordingly, the present invention should be construed to include all other alternations, modifications, and changes which fall within the scope of the claims.

In the description regarding the present invention, when it is said that one element is "connected" or "coupled" to the other element, the one element may be directly connected or coupled to the other element, but it should be understood that a third element may exist between the two elements. In contrast, when it is said that one element is "directly connected" or "directly coupled" to the other element, it should be understood that a third element does not exist between the two elements.

The invention claimed is:

1. A method for wireless communication by a user equipment (UE) of which a downlink data bandwidth is limited, the method comprising:
   receiving an enhanced physical downlink control channel (EPDCCH) monitoring subframe configuration on an EPDCCH based on the limited downlink data bandwidth of the UE;

receiving unicast data in a first set of physical resource blocks (PRBs) at an EPDCCH monitoring subframe configured by the EPDCCH monitoring subframe configuration;

receiving broadcast data in a second set of PRBs at a non-EPDCCH monitoring subframe; and transmitting signals on an uplink channel based on the received unicast data and the received broadcast data, wherein the first set of PRBs and the second set of PRBs are different from each other, and wherein the EPDCCH monitoring subframe and the non-EPDCCH monitoring subframe are different from each other, and multiplexed by time division multiplexing (TDM).

2. The method of claim 1, wherein the EPDCCH monitoring subframe configuration is received at the EPDCCH monitoring subframe by same-subframe scheduling.

3. The method of claim 1, wherein the EPDCCH monitoring subframe configuration is received at a subframe prior to the EPDCCH monitoring subframe by cross-subframe scheduling.

4. The method of claim 1, wherein the first set of PRBs and the second set of PRBs are pre-determined based on a resource block group (RBG).

5. The method of claim 1, wherein the first set of PRBs and the second set of PRBs are pre-determined based on a system bandwidth by a table, which is selected based on a cell radio network temporary identifier (C-RNTI) of the UE.

6. The method of claim 1, wherein the non-EPDCCH monitoring subframe is a subframe next to the EPDCCH monitoring subframe.

7. The method of claim 1, wherein the UE determines allocated resource blocks are valid when the allocated resource blocks are monitored based on the EPDCCH monitoring subframe configuration.

8. An apparatus for wireless communication of which a downlink data bandwidth is limited, the apparatus comprising:

a radio frequency (RF) unit; and a processor operatively coupled to the RF unit and that:
controls the RF unit to receive an enhanced physical downlink control channel (EPDCCH) monitoring subframe configuration on an EPDCCH based on the limited downlink data bandwidth of the UE, controls the RF unit to receive unicast data in a first set of physical resource blocks (PRBs) at an EPDCCH monitoring subframe configured by the EPDCCH monitoring subframe configuration, controls the RF unit to receive broadcast data in a second set of PRBs at a non-EPDCCH monitoring subframe, and controls the RF unit to transmit signals on an uplink channel based on the received unicast data and the received broadcast data, wherein the first set of PRBs and the second set of PRBs are different from each other, and wherein the EPDCCH monitoring subframe and the non-EPDCCH monitoring subframe are different from each other, and multiplexed by time division multiplexing (TDM).

9. The apparatus of claim 8, wherein the EPDCCH monitoring subframe configuration is received at the EPDCCH monitoring subframe by same-subframe scheduling.

10. The apparatus of claim 8, wherein the EPDCCH monitoring subframe configuration is received at a subframe prior to the EPDCCH monitoring subframe by cross-subframe scheduling.

11. The apparatus of claim 8, wherein the first set of PRBs and the second set of PRBs are pre-determined based on a resource block group (RBG).

12. The apparatus of claim 8, wherein the first set of PRBs and the second set of PRBs are pre-determined based on a system bandwidth by a table, which is selected based on a cell radio network temporary identifier (C-RNTI) of the UE.

13. The apparatus of claim 8, wherein the non-EPDCCH monitoring subframe is a subframe next to the EPDCCH monitoring subframe.

14. The apparatus of claim 8, wherein the processor further determines allocated resource blocks are valid when the allocated resource blocks are monitored based on the EPDCCH monitoring subframe configuration.

* * * * *